(12) United States Patent
Foster (10) Patent No.: US 9,884,510 B1
(45) Date of Patent: Feb. 6, 2018

(54) PEN COMBINATION

(71) Applicant: Kecia I Foster, Ocoee, FL (US)

(72) Inventor: Kecia I Foster, Ocoee, FL (US)

( * ) Notice: Subject to any disclaimer, the term of this patent is extended or adjusted under 35 U.S.C. 154(b) by 0 days.

(21) Appl. No.: 15/239,361

(22) Filed: Aug. 17, 2016

Related U.S. Application Data

(63) Continuation-in-part of application No. 14/276,484, filed on May 13, 2014, now abandoned.

(51) Int. Cl.
*B43K 29/08* (2006.01)
*B43K 23/08* (2006.01)
*G06F 3/046* (2006.01)
*G06F 3/0354* (2013.01)
*G06F 3/0488* (2013.01)

(52) U.S. Cl.
CPC ............. *B43K 29/08* (2013.01); *B43K 23/08* (2013.01); *G06F 3/03545* (2013.01); *G06F 3/046* (2013.01); *G06F 3/0488* (2013.01); *G06F 3/04883* (2013.01); *G06F 2200/1632* (2013.01); *G06F 2203/041* (2013.01); *G06F 2203/04106* (2013.01); *G06F 2203/04108* (2013.01)

(58) Field of Classification Search
CPC ..... B43K 29/08; B43K 23/08; G06F 3/03545; G06F 3/046; G06F 2203/04106; G06F 3/04883; G06F 3/0488; G06F 2200/1632
See application file for complete search history.

(56) References Cited

U.S. PATENT DOCUMENTS

| | | | |
|---|---|---|---|
| 4,317,638 A | 3/1982 | Klaber | |
| D431,598 S | 10/2000 | Kim et al. | |
| 6,412,998 B1 | 7/2002 | Ham | |
| D499,447 S | 12/2004 | Hui-Kuo | |
| D500,790 S | 1/2005 | Jaakkola | |
| D502,216 S * | 2/2005 | Chen | D14/480.3 |
| 6,932,276 B1 * | 8/2005 | Liu | B43K 29/093 |
| | | | 235/486 |
| D545,896 S * | 7/2007 | Qiu | D14/480.3 |
| 7,347,638 B1 * | 3/2008 | Lin | B43K 27/00 |
| | | | 340/321 |
| 7,401,992 B1 * | 7/2008 | Lin | B43K 23/126 |
| | | | 401/131 |
| 7,524,198 B2 | 4/2009 | Nguyen et al. | |
| 7,802,909 B2 * | 9/2010 | Baker | A61B 1/227 |
| | | | 362/183 |
| 8,625,270 B2 * | 1/2014 | Ni | G06F 21/32 |
| | | | 361/679.02 |

(Continued)

OTHER PUBLICATIONS

AYL Executive Ballpoint Pen with Stylus and 8GB 2.0 USB Flash Drive—Silver. Product Listing [online]. AYL, 2012 [retrieved on Jan. 18, 2013]. Retrieved from the Internet: http://www.amazon.com/Accessorise-Executive-Ballpoint-Stylus--Silver/dp/B0093AO7TS/ref=sr_1_1?s=electronics&ie=UTF8&qid=1357882176&sr=1-1&keywords=flash+drive%2C+pen+and+stylus.

*Primary Examiner* — Sejoon Ahn
(74) *Attorney, Agent, or Firm* — Robert C. Montgomery; Montgomery Patent and Design, LP.

(57) ABSTRACT

A pen-shaped apparatus includes a key ring, a stylus, an ink pen, and a flash drive in a preferred embodiment are configured to interconnect with each other to form a single unit. When assembled together, the flash drive fits into a bottom portion of the ink pen while the stylus is attached to a top of the pen. The compiled flash drive, ink pen, and stylus are collectively attached to a cap having a key ring feature that allows for convenient attachment of the device to a support structure.

6 Claims, 4 Drawing Sheets

(56) References Cited

U.S. PATENT DOCUMENTS

| | | | |
|---|---|---|---|
| 9,283,802 B2* | 3/2016 | Briggl | B43K 7/005 |
| 9,561,683 B2* | 2/2017 | O'Connor | B43K 23/12 |
| 2003/0132923 A1* | 7/2003 | Hu | G06F 3/03545 |
| | | | 345/179 |
| 2003/0215278 A1* | 11/2003 | Kageyama | B43K 27/02 |
| | | | 401/21 |
| 2004/0057233 A1* | 3/2004 | Sharrah | F21L 4/027 |
| | | | 362/205 |
| 2005/0086413 A1* | 4/2005 | Lee | G06K 19/077 |
| | | | 710/313 |
| 2005/0265771 A1* | 12/2005 | Lord | B08B 1/00 |
| | | | 401/198 |
| 2006/0028803 A1* | 2/2006 | Pocrass | G06K 19/077 |
| | | | 361/737 |
| 2006/0047880 A1* | 3/2006 | Lindblom | G06F 13/426 |
| | | | 710/305 |
| 2006/0143874 A1* | 7/2006 | Cetera | B43K 25/024 |
| | | | 24/10 R |
| 2006/0248729 A1* | 11/2006 | Shivas | B26B 27/007 |
| | | | 30/165 |
| 2008/0030486 A1* | 2/2008 | Cook | G06F 3/03545 |
| | | | 345/179 |
| 2010/0077229 A1* | 3/2010 | Yu | G06F 11/1456 |
| | | | 713/193 |
| 2010/0221060 A1 | 9/2010 | Yu | |
| 2014/0247238 A1* | 9/2014 | Chang | G06F 3/044 |
| | | | 345/174 |
| 2015/0022503 A1* | 1/2015 | Chang | G06F 3/03545 |
| | | | 345/179 |

* cited by examiner

PEN COMBINATION

RELATED APPLICATIONS

The present invention is a Continuation-in-Part and claims the benefit of U.S. non-Provisional application Ser. No. 14/276,484, filed on May 13, 2014, the entire disclosures of which are incorporated herein by reference.

FIELD OF THE INVENTION

The present invention relates to an apparatus that houses a key ring, a stylus, an ink pen, and a flash drive within a single unit.

BACKGROUND OF THE INVENTION

There are many types of office supplies that combine multiple features into a single, easy-to-use device. Particularly, writing implements that are commonly used and interchanged within a single task are abundantly found, such as pens, pencils, highlighters, erasers, ink removers, and other similar features. Having all of these features at one's convenient disposal not only results in an increase in convenience but in efficiency as well.

With the advent of computers, however, many of us want, or need, to record data and notes electronically in addition to reducing such things to writing. Therefore, it would be beneficial to have a device that includes all of the necessary writing and electronic recordation instruments one (1) typically uses in a convenient and easy-to-use implement. Portable flash drives and other memory devices are currently popular tools for storing and transporting digital data. And, styluses are favored by many when manipulating keypads and keyboards of mobile electronic devices. Therefore, there is a current need to incorporate such features into a writing implement. The development of the pen fulfills this need.

The device of the current invention is a writing implement divided into separable sections, including a pen section, a pair of flash drive sections separated by a flash drive receiver section, a pair of keypad styluses, a cap section and an end cap section. The end cap section further includes a fastening ring. Each section is configured to fit into and secure to each other via friction fit or snapping fit connections to form a single cylindrical pen-like unit being attachable to a user's key chain or similar appendage via a fastening ring portion of the cap section. Each section can be used independently or while connected to another section to assist a user with note-taking and data recordation.

Prior art in this field consists of combination writing instruments with data storage units, combination writing instruments with fastening rings, or combination data storage units with fastening rings. None of the prior art provides a single device having a writing instrument, a data storage unit, a stylus, and a fastening ring that may be separated into pieces and used individually, or kept joined all-together and used as a single unit, or used in any permutated combination thereof.

It is an objective of the present invention to provide a writing implement that is segmented into interconnecting sections, where each section may be used independent of each other.

It is a further objective of the present invention to provide a writing instrument with segmented sections that include a data storage unit, a stylus, a refillable ink pen, and a cap with a fastening ring.

It is a further objective of the present invention to enable each section to removably connect to the other via an interference fit so as to facilitate ease of use and convenient access to each sections.

SUMMARY OF THE INVENTION

The device comprises a recordation implement having a pen cap section which has a pen cap first end and a pen cap second end, a pen section which is adapted to retain a writing implement inside which has a pen section first end and a pen section second end, a first flash drive section which has a first flash drive section first end and a first flash drive section second end, a flash drive receiver which has a flash drive receiver first end and a flash drive receiver second end, a second flash drive section which has a second flash drive section first end and a second flash drive section second end and an end cap section which has an end cap section first end and an end cap section second end. The pen cap second end is securable to the pen section first end. The pen section first end is securable to the first flash drive section first end. The first flash drive section second end is securable to the flash drive receiver first end. The flash drive receiver second end is securable to the second flash drive section first end. The second flash drive section second end is securable to the end cap section first end.

The pen cap section also may comprise of a first stylus tip which is secured about the pen cap first end and be made of rubber. The pen section may also comprise of a pen section housing, a writing implement retractor which is secured at the pen section first end which has a first writing implement retractor end and a second writing implement retractor end, a second stylus tip which is secured about the writing implement retractor first end and a first USB socket receiver cavity which is secured within the second pen section end. The writing implement projects through an aperture centrally located within the writing implement retractor first end and the second stylus tip when the writing implement retractor is rotated in a first direction and retracts through the aperture when the writing implement retractor is rotated in a second direction. The second stylus tip may also comprise of rubber.

The first flash drive section may also comprise of a first flash drive section housing, a memory circuit which is centrally secured within the first flash drive section housing, a first Universal Serial Bus (USB) connector which projects from the first flash drive section first end and is in electrical communication with the memory circuit and a second USB connector which projects from the first flash drive section second end and is in electrical communication with the memory circuit. The memory circuit is configured to store and supply digital data stored within when the first USB connector or second USB connector is connected with any device having a suitable USB interface receptacle. The first USB connector is also capable of removable connection within the first USB socket receiver cavity.

The flash drive receiver may also comprise of a flash drive receiver housing, a second USB socket receiver cavity secured within the flash drive receiver first end and a third USB socket receiver cavity which is secured within the flash driver receiver second end. The second USB connector is capable of removable connection within the second USB socket receiver cavity.

The second flash drive section may also comprise of a second flash drive section housing, a memory/battery circuit which is centrally secured within the second flash drive section housing, a third USB connector which projects from the second flash drive section first end and is in electrical communication with the memory/battery circuit and a fourth USB connector which projects from the second flash drive section second end and is in electrical communication with the memory/battery circuit. The memory/battery is configured to store and supply digital data stored within when the third USB connector or fourth USB connector is connected with any device having a suitable USB interface receptacle. The memory/battery is also configured to store and supply power stored within when the third USB connector or fourth USB connector is connected with any device having a suitable USB interface receptacle. The second USB connector is capable of removable connection within the third USB socket receiver cavity. The second flash drive section further comprises a pocket clip which may be secured lengthwise and subjacent the second flash drive section second end.

The end cap section may comprise of an end cap section housing, a pair of fastening ring apertures which are secured subjacent to the end cap section second end, a fastening ring which has a fastening ring first end and a fastening ring second end secured within a respective one (1) of the pair of fastening rings and a fourth USB socket receiver cavity. The fourth USB connector is capable of friction fitting within the third USB socket receiver cavity. Lastly, with respect to this embodiment, the pen cap section, the pen section, the flash drive section, the flash drive receiver, the second flash drive section and the end cap section are configured to form a coextensive structure when combined.

An alternate embodiment of the recordation implement comprises of a flash drive section which has a flash drive section first end and a flash drive section second end, a pen section which is adapted to retain a writing implement therein which has a first pen section end and a second pen section end, a pen cap section which has a pen cap first end and a pen cap second end and an end cap section which has an end cap section first end and an end cap section second end. The flash drive section second end is securable to the pen section first end. The pen section second end is securable to the pen cap section first end. The pen cap second end is securable to the end cap section first end.

The flash drive section may also comprise of a flash drive section housing, a memory circuit which is centrally secured within the flash drive section housing and a USB connector which projects from the flash drive section second end and is in electrical communication with the memory circuit. The memory circuit is configured to store and supply digital data stored within when the USB connector is connected with any device having a suitable USB interface receptacle.

The pen section may also comprise of a pen section housing and a USB socket receiver cavity which is secured within the pen section first end. The USB connector is capable of removable connection within the USB socket receiver cavity. The pen cap section may also comprise of a writing implement receptacle which is secured within the pen cap first end and a stylus tip which projects from the pen cap second end. The writing implement receptacle is configured to removably attach about the writing implement.

The end cap section may also comprise of an end cap section housing, a stylus tip receiver cavity which is secured within the end cap section first end and a fastening ring which is secured superjacent to the end cap section second end. The stylus tip receiver cavity is configured to removably attach about the stylus tip. The stylus tip may be made of rubber. The fastening ring may comprise of an oval shape. Lastly, with respect to this alternate embodiment, the flash drive section, the pen section, the pen cap section and the end cap section are configured to form a coextensive structure when combined.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 pen combination
15 pen cap section
17 pen receiver
19 first stylus tip
20 pen section
21 pen section housing
22 ball point pen
23 second stylus tip
24 ink cartridge
25 ball point tip retractor
27 first USB socket
30 first flash drive section
31 first flash drive housing
32a first USB connector
32b second USB connector
34 memory circuit
40 flash drive receiver
41 receiver housing
42 second USB socket
44 third USB socket
50 second flash drive section
52 second flash drive housing
54 memory/battery circuit
56 pocket clip
58a third USB connector
58b fourth USB connector
60 end cap section
62 cap housing
63a fastening ring
63b ring aperture
64 fourth USB socket
200 alternate embodiment
220 alternate pen section
221 alternate pen section housing
244 alternate USB socket
250 alternate flash drive section
252 alternate flash drive housing
260 alternate end cap section
262 alternate cap housing
263 alternate fastening ring
264 stylus tip socket
265 alternate memory circuit

DETAILED DESCRIPTION OF THE PREFERRED EMBODIMENT

Figure 1:
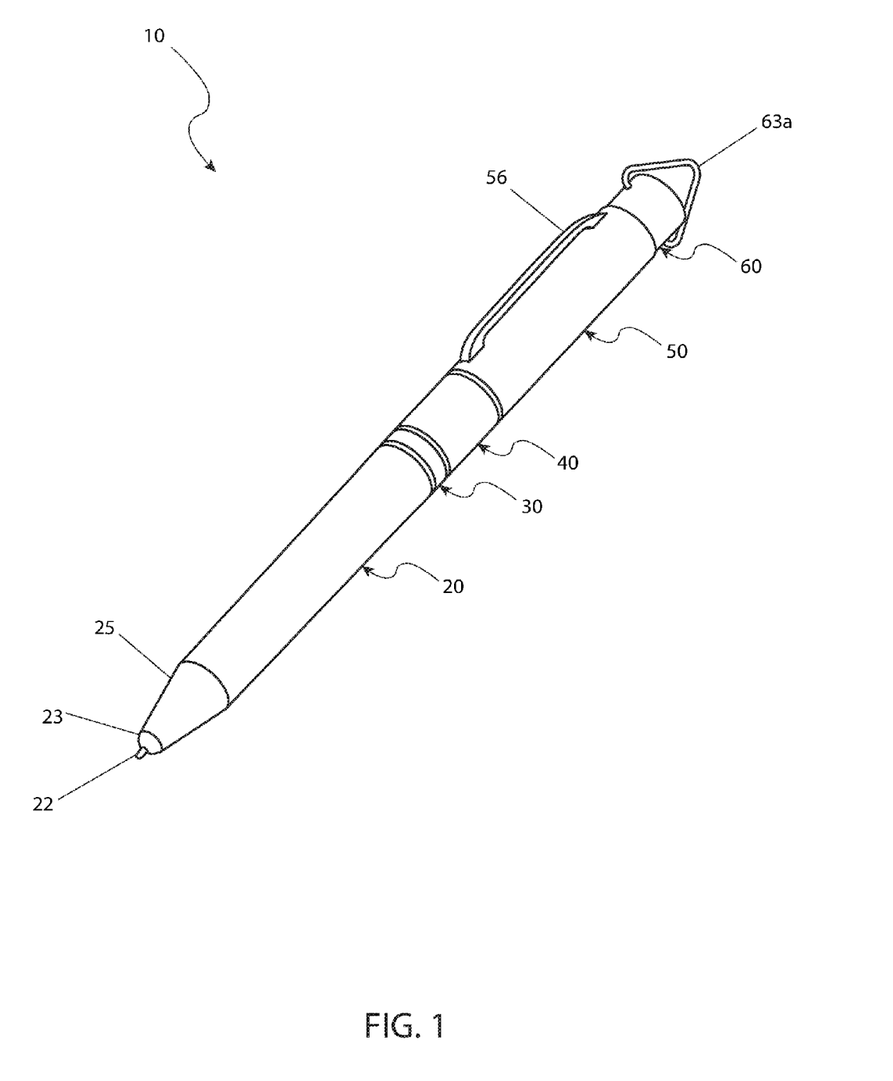
FIG. 1 is a perspective view of a pen combination 10, according to a preferred embodiment of the present invention.
Figure 2:
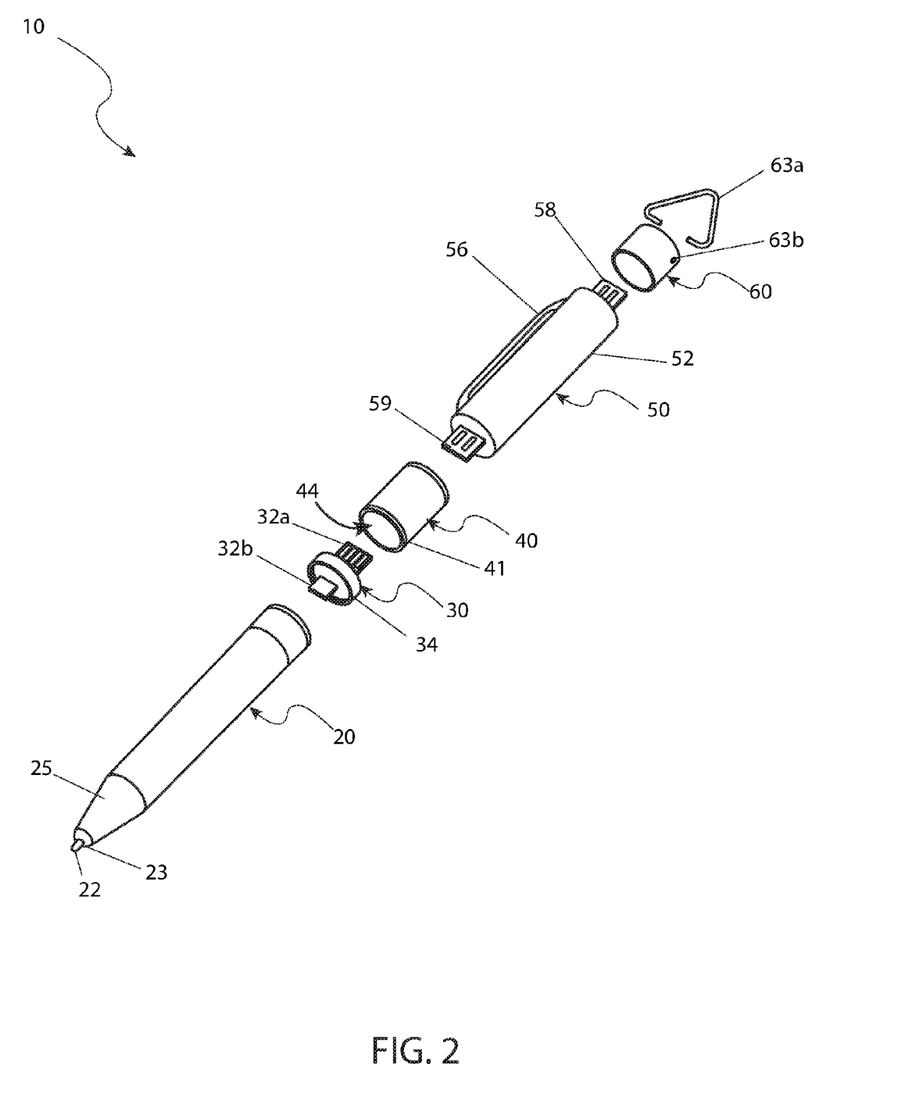
FIG. 2 is an exploded perspective view of the pen combination 10, according to a preferred embodiment of the present invention.
Figure 3:
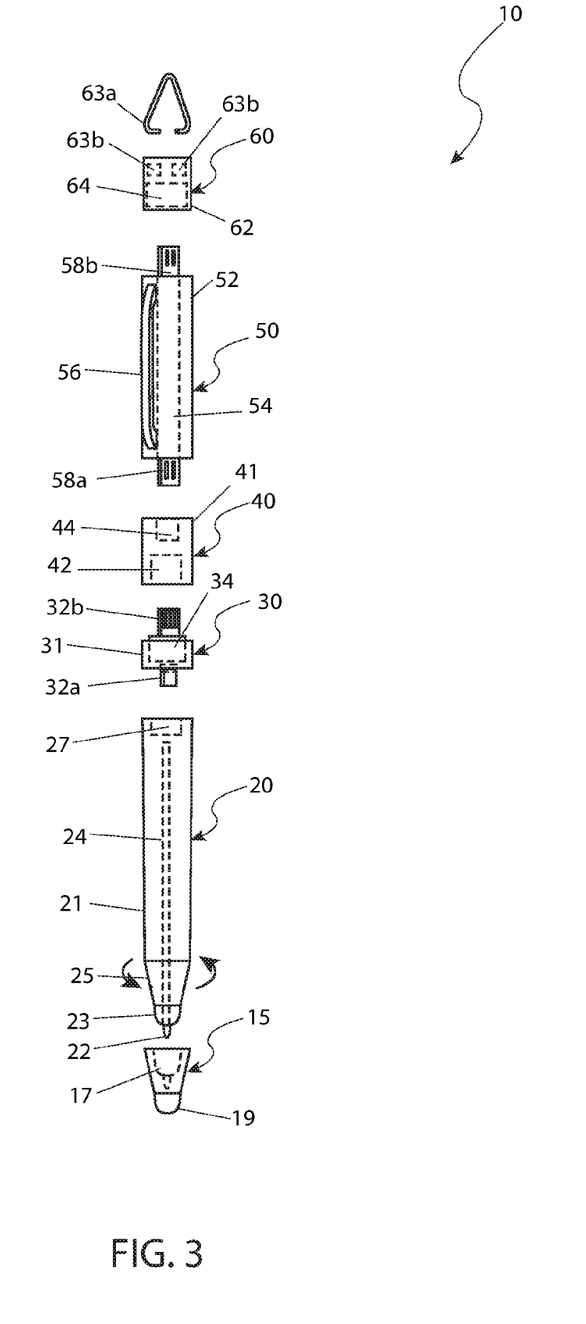
FIG. 3 is exploded front view of the pen combination 10, according to a preferred embodiment of the present invention; and, FIG. 4 is an exploded side view of an alternate embodiment 200 of the pen combination 10, according to an alternate embodiment of the present invention.
Figure 4:
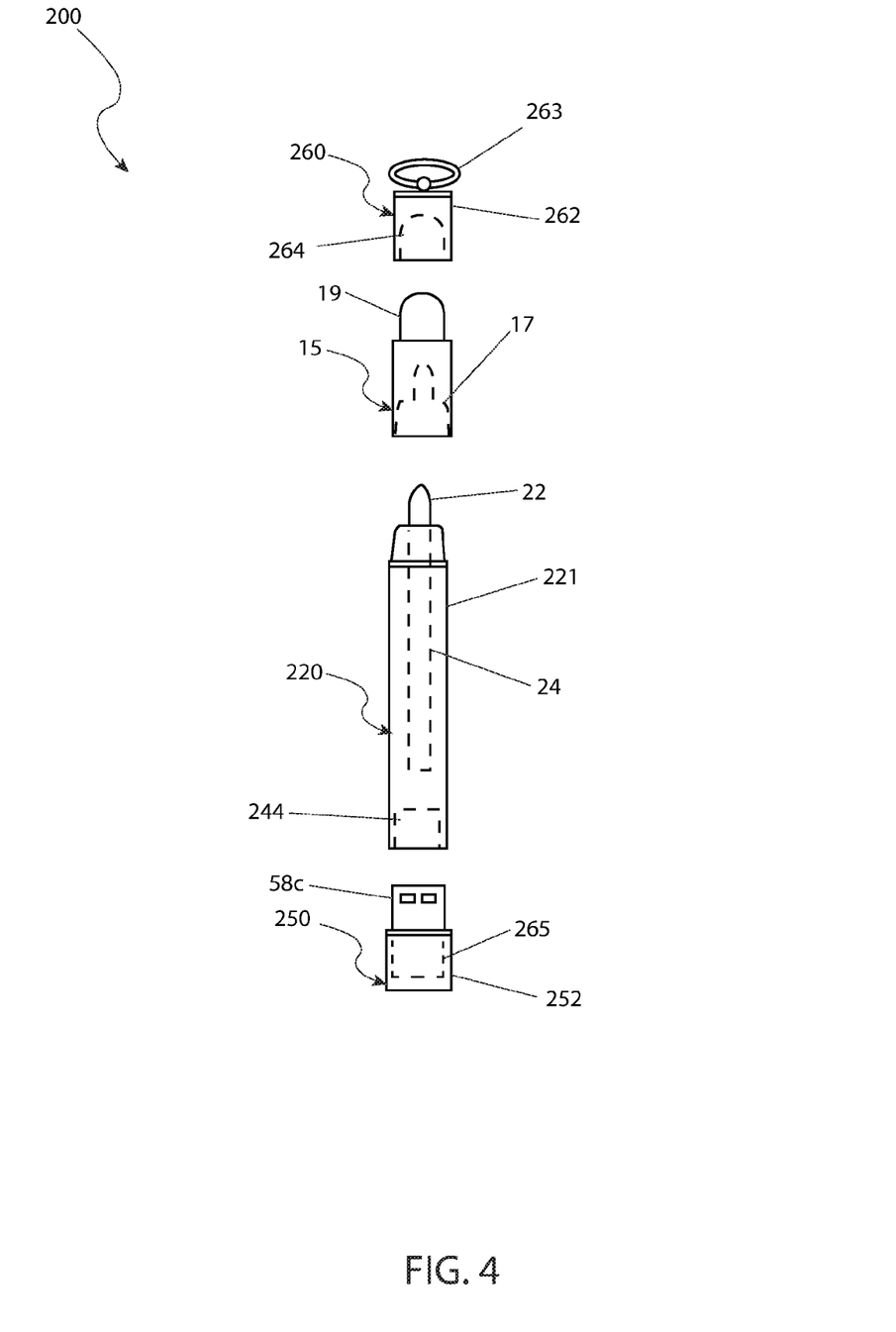

The best mode for carrying out the invention is presented in terms of its preferred embodiment, herein depicted within FIGS. 1 through 3, and in terms of an alternate embodiments herein depicted within FIG. 4. A person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a pen combination (herein described as the "device") 10, which provides a writing implement divided into separable sections including a pen cap section 15, a pen section 20, a first flash drive section 30, a flash drive receiver section 40, a second flash drive section 50, and an end cap section 60. Each section 20, 30, 40, 50, 60 can be used independently or while connected to one (1) or more other sections to assist a user with note-taking, data transfer, and small device charging.

Referring now to FIG. 1, a perspective view of the device 10, according to a preferred embodiment of the present invention, is disclosed. The device 10 provides an assembly of removable segments which when combined, have coextensive cylindrical sections 20, 30, 40, 50, 60. The sections of the device 10 are envisioned to be introduced in a plurality of models and made of plastic or metal materials. The sections 20, 30, 40, 50, 60 are also envisioned to be introduced having various attractive colors, patterns, and finishes applied to external surfaces.

The pen section 20, the first flash drive section 30, the flash drive receiver section 40, the second flash drive section 50, and the end cap section 60 are configured to fit into and secure to each other via friction fit or snapping fit connections. A pivoting fastening ring portion 63a of the end cap section 60 is envisioned to allow convenient attachment of the device 10 to an existing appendage such as a user's key chain, a purse strap, or similar appendage.

The device 10 may also be provided with a protective pen cap section 15 to protect a ball point pen portion 22 of the pen section 20. The pen cap section 15 includes a pen socket 17 and a first stylus tip 19, being shaped and sized so as to provide secure friction or snapping fit onto the pen section 20.

The pen section 20 includes a second stylus tip 23 having a central retractable ball point pen 22. The ball point pen 22 may be retracted or extended by a user by rotating a ball point retractor portion 25 located superjacent to the second stylus tip 23. The second stylus tip 23 is illustrated here including a miniature dome-shaped appendage similar in shape to a pencil eraser, which acts as a convenient user interface for touch screens, Smartphones, and the like; however, other shapes may be utilized such as bullet-nose, conical, or the like, based upon a user's preference, and as such should not be interpreted as a limiting factor of the device 10. The stylus tip 23 is envisioned to be made of rubber or soft plastic being especially useful for use with miniature keypads such as those found on a mobile telephone, an IPAD®, and the like. The soft nature of the stylus tip 23 is designed to prevent scratching or marring of contact surface portions of expensive electronic devices.

The pen section 20 is shown here with the first flash drive section 30 being attached to a top portion, the device 10 is not limited to the illustrated embodiment, and a person skilled in the art will appreciate that many other arrangements and methods of connection between the various sections 15, 20, 30, 40, 50, 60 are possible without deviating from the basic concept and as such should not be interpreted as a limiting factor of the present invention 10 (see FIG. 4). Each section 15, 20, 30, 40, 50, 60 of the device 10 is configured to fit into and secure to each other via friction fit or snapping fit connections to form a single cylindrical pen-like unit. Furthermore, due to the friction or snapping connections between adjacent sections 15, 20, 30, 40, 50, 60, the device 10 allows for partial assembly during use based upon an intended usage and preference. Furthermore, it is envisioned that the end cap section 60 would be detached and remain affixed to an existing appendage while the remainder of the sections 15, 20, 30, 40, 50 would be utilized separately.

Referring now to FIGS. 2 and 3, exploded views of the device 10, according to a preferred embodiment of the present invention, is disclosed. The pen section 20 further includes a pen section housing 21, a retractable ball-point pen 22 having an integral replaceable ink cartridge 24, and a rotating ball point tip retractor 25. The pen section housing 21 includes an internal first USB socket 27 along a top end portion, illustrated here providing physical retention of a first USB connector portion 32a of the superjacent first flash drive section 30. The pen section housing 21 provides a user a means for easy grasping and writing. The rectangular first female USB socket portion 27 is to be sized so as to receive and retain a second USB connector portion 32b of the superjacent first flash drive section 30 preferably using a friction fit.

The first flash drive section 30 is shown here depicting a dual USB device having an internal memory circuit 34, envisioned to provide uDisk functions, share memory data with a personal computer (PC) USB, and sync data with a Smartphone. The first flash drive section 30 includes a first flash drive housing 31 with the memory circuit 34 within. The memory circuit 34 provides a means for internal digital data and software storage. The first flash drive housing 31 in turn includes a first USB connector 32a at one (1) end, and a second USB connector 32b at an opposing end portion, thereby providing adaptable transmission of data and software to various electronic devices such as a computers and other electronic devices. The first flash drive housing 31 includes an outer diameter being coextensive with the outer diameter and appearance of the aforementioned pen section housing 21, thereby providing a continuous discrete profile when assembled (also see FIG. 1).

The flash drive receiver 40 provides a means to mechanically conjoin the first flash drive section 30 and the second flash drive section 50. The flash drive receiver 40 provides a cylindrical receiver housing 41 including a second USB socket 42 at one (1) end and a third USB socket 44 at an opposing end portion, thereby providing a secure friction fit of second USB connector 32b and third USB connector 58a portions of the first flash drive section 30 and the second flash drive section 50, respectively. The receiver housing 41 is to provide a similar diameter as the subjacent first flash drive housing 31 and superjacent second flash drive housing 52, thereby providing a continuous cylindrical profile.

The second flash drive section 50 includes an elongated second flash drive housing 52 having an integral arcuate pocket clip portion 56 along a side surface portion, which provides convenient attachment of the device 10 to a shirt pocket, purse, pant pocket, or the like. The second flash drive section 50 provides a housing means for an internal memory/battery circuit 54. The second flash drive housing 52 in turn includes a third USB connector 58a at one (1) end, and a fourth USB connector 58b at an opposing end portion. The memory/battery circuit portion 54 is envisioned to provide digital data and software storage, as well as battery power storage for recharging small electronic devices; however, is it further envisioned that various interchangeable "add-ons" having a similar shape and attachment means which would be inserted into the device 10 in place of the second flash drive section 50, providing various functions such as, but not limited to: a small device charging battery pack, crystals, WiFi, a laser pointer, and the like, and as such should not be interpreted as a limiting factor of the device 10.

The end cap section 60 includes a cylindrical cap housing 61 with a fourth USB socket 64 at one (1) end which provides mechanical retention of the aforementioned fourth USB connector portion 58b of the second flash drive section 50. The outer diameter of the end cap section 60 is coextensive with the outer diameter of the second flash drive section 50. The end cap section 60 further includes a pair of ring apertures 63b at a remaining end portion which allow insertion of a fastening ring 63a. The fastening ring 63a is envisioned to be a circular, rectangular, or triangular shape, and provides convenient and secure attachment of the device 10 an appendage such as a necklace, a purse strap, or the like.

The elongated second flash drive section 50 is shown here depicting an additional dual USB envisioned to provide uDisk functions, share memory with a PC USB, synchronize data with a Smartphone, and provide a memory/battery circuit portion 54 for simultaneous charging of various mobile devices. It is understood that the portions of the device 10 may be rearranged and connected as desired (see FIG. 4). Furthermore, the USB connectors 32a, 32b, 58a, 58b and corresponding USB sockets 27, 42, 44, 64 are depicted here using standard-USB and mini-USB type connections; however, it is understood that the device 10 is not limited to current USB technology, but may utilize various other current electronic and electrical connector technologies, and as such should not be interpreted as a limiting factor of the device 10.

Referring now to FIG. 4, an exploded side view of a first alternate embodiment 200 of the pen combination 10, according to an alternate embodiment of the present invention, is disclosed. It is understood that the device 10 is not limited to the previously illustrated embodiment, and a person skilled in the art will appreciate that many other arrangements of writing 20 and memory devices 30, 50, as well as methods to interconnect the sections 20, 30, 40, 50, 60 are possible without deviating from the basic concept and as such should not be interpreted as a limiting factor of the present invention 10.

A particular alternate embodiment 200 of the device 10 is illustrated here for example sake which includes an alternate flash drive section 250, an alternate pen section 220, a pen cap section 15, and an alternate end cap section 260. The alternate flash drive section 250 provides similar data storage and transfer functionality as the previously described first flash drive section 30 having a memory circuit 265. The alternate flash drive section 250 includes a fifth USB connector portion 58c, in electrical communication with a memory circuit 265, which provides stand-alone connectivity to various USB devices. The alternate pen section 220 includes an alternate pen section housing 221 having an integral alternate USB socket 244 and stationary ball point pen 22 and ink cartridge 24 portions. The protective pen cap section 15 is shaped and sized to attach to a top end of the alternate pen section 220 to protect the protruding ball point pen portion 22 (also see FIG. 3). An embodiment of the alternate end cap section 260 is shown here being configured to fit onto an end portion of the pen cap section 15 via a friction fit or snapping fit, and includes an alternate cap housing 262, an oval-shaped alternate fastening ring 263, and a stylus tip socket 264. The outer diameter of the portions of the alternate embodiment 200 are envisioned to be coextensive with each other in a similar manner as the preferred device 10.

It is envisioned that other styles and configurations of the present invention can be easily incorporated into the teachings of the present invention, and only one (1) particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be introduced in an assembled state as indicated in FIG. 1, and may be separated into individual sections 15, 20, 30, 40, 50, 60 as indicated in FIG. 2.

The method of utilizing the device 10 may be achieved by performing the following steps: procuring a model of the device 10 having a preferred external appearance and color scheme, and attaching the fastening ring portion 62 of the cap section 60 to an easily accessible appendage such as a key ring or a suitable feature of a purse until needed.

The method of utilizing the pen section 20 of the device 10 may be achieved by performing the following steps: releasing the cap section 60 from the second flash drive section 50 by grasping the cap section 60 in one (1) hand, and the second flash drive section 50 in the other hand; separating the cap section 60 from the second flash drive section 50, allowing the cap section 60 to remain attached to the appendage; grasping the pen section 20 in one (1) hand and the pen cap section 15 in the other hand; separating the pen section 20 from the pen cap section 15; holding the pen section 20 along with attached sections 30, 40, 50 in a similar manner as a normal pen; utilizing the stylus tip portion 23 of the pen section 20, with the ball point pen 22 retracted, to contact miniature keypads such as those found on mobile telephones, an IPAD®, and the like; utilizing the ball point pen 22 by rotating the ball point retractor portion 25 to extend the ball point pen 22; using the pen section 20 to perform normal writing tasks as needed; restoring the device 10 by rotating the ball point retractor portion 25 to retract the ball point pen 22; and, insertingly connecting the pen section 20 along with the attached sections 30, 40, 50 to the end cap section 60 until needed again.

The method of utilizing the first flash drive section 30 of the device 10 may be achieved by performing the following steps: grasping the pen section 20 in one (1) hand and the first flash drive section 30 in the other hand; detaching the first USB connector portion 32a of the first flash drive section 30 from the first USB socket portion 27 of the pen section 20; grasping the flash drive receiver 40 in one (1) hand, and the first flash drive section 30 in the other hand; detaching the second USB connector portion 32b of the first flash drive section 30 from the second USB socket portion 42 of the flash drive receiver 40; utilizing the capabilities of the memory circuit portion 34 and connectors 32a, 32b of the first flash drive section 30 via insertion of the USB connectors 32a, 32b into a computer or other electronic device in a conventional manner; and, restoring the device 10 by re-connecting the first flash drive section 30 to the pen section 20 and the flash drive receiver 40 by inserting the first 32a and second 32b USB connectors into respective first 27 and second 42 USB socket portions until securely engaged.

The method of utilizing the second flash drive section 50 of the device 10 may be achieved by performing the following steps: grasping the end cap section 60 in one (1) hand and the second flash drive section 50 in the other hand; separating the fourth USB connector portion 58b of the second flash drive section 50 from the fourth USB socket portion 64 of the end cap section 60; grasping the flash drive receiver 40 in one (1) hand and the second flash drive section 50 in the other hand; detaching the third USB connector portion 58a of the second flash drive section 50 from the third USB socket portion 44 of the flash drive receiver 40; utilizing the capabilities of the memory/battery circuit 54 and connectors 58a, 58b of the second flash drive section 50 via insertion into a computer or other electronic devices; and, restoring the device 10 by re-connecting the second flash drive section 50 to the flash drive receiver 40 and end cap section 60 portions until securely engaged.

The method of utilizing the alternate flash drive section 250 of the alternate embodiment 200 of the device 10 may be achieved by performing the following additional steps: utilizing the alternate flash drive section 250 by grasping the alternate flash drive section 250 in one (1) hand, and the alternate pen section 220 in the other hand; detaching the alternate flash drive section 250 from the alternate pen section 220; utilizing the memory capabilities of the alternate flash drive section 250 via insertion into a computer or other electronic device; and, restoring the device 10 by re-connecting the alternate flash drive section 250 and alternate pen section 220 portions until securely engaged.

The method of utilizing the alternate pen section 220 of the alternate embodiment 200 may be achieved by performing the following steps: grasping the alternate pen section 220 in one (1) hand and the pen cap section 15 along with the attached alternate end cap section 260 in the other hand; separating the pen section 20 from the pen cap section 15; using the ball point pen portion 22 of the alternate pen section 220 to perform normal writing tasks as needed; and, restoring the device 10 by inserting the alternate pen section 220 into the pen cap section 15.

The method of utilizing the first stylus tip portion 19 of the pen cap section 15 of the alternate embodiment 200 may be achieved by performing the following steps: grasping the alternate end cap section 260 in one (1) hand, and the pen cap section 15 in the other hand; detaching the alternate end cap section 260 and pen cap section 15 portions; utilizing the first stylus tip portion 19 to contact various miniature keypads; and, restoring the device 10 by inserting the pen cap section 15 into the alternate end cap section 260 until securely engaged.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A recordation implement, comprising:
a pen cap section having a pen cap first end, a first stylus tip secured about said pen cap first end, and a pen cap second end;
a pen section having a pen section housing adapted to retain a writing implement therein, further having:
   a pen section first end and a pen section second end;
   a writing implement retractor secured at said pen section first end having a writing implement retractor first end and a writing implement retractor second end;
   a second stylus tip secured about said writing implement retractor first end; and
   a first USB socket receiver cavity secured within said pen section second end;
a first flash drive section, having:
   a first flash drive section housing;
   a first flash drive section first end and a first flash drive section second end;
   a memory circuit centrally secured within said first flash drive section housing;
   a first USB connector projecting from said first flash drive section first end and in electrical communication with said memory circuit; and
   a second USB connector projecting from said first flash drive section second end and in electrical communication with said memory circuit;
a flash drive receiver, having:
   a flash drive receiver housing;
   a flash drive receiver first end and a flash drive receiver second end;
a second USB socket receiver cavity secured within said flash drive receiver first end; and
a third USB socket receiver cavity secured within said flash driver receiver second end;
a second flash drive section; having:
   a second flash drive section first end and a second flash drive section second end; a second flash drive section housing;
   a memory/battery circuit centrally secured within said second flash drive section housing;
   a third USB connector projecting from said second flash drive section first end and in electrical communication with said memory/battery circuit; and
   a fourth USB connector projecting from said second flash drive section second end and in electrical communication with said memory/battery circuit; and
   an end cap section having an end cap section first end and an end cap section second end; wherein said pen cap second end is securable to said pen section first end; wherein said writing implement projects through an aperture centrally located within said writing implement retractor first end and said second stylus tip when said writing implement retractor is rotated in a first direction,
wherein said writing implement retracts through said aperture when said writing implement retractor is rotated in a second direction,
wherein said pen section second end is securable to said first flash drive section first end,
wherein said memory circuit is configured to store and supply digital data stored therewithin when said first USB connector or second USB connector is connected with any device having a suitable USB interface receptacle, wherein said first USB connector is capable of removable connection within said first USB socket receiver cavity, wherein said second USB connector is capable of removable connection within said second USB socket receiver cavity, wherein said first flash drive section second end is securable to said flash drive receiver first end, wherein said flash drive receiver second end is securable to said second flash drive section first end, wherein said second flash drive section second end is securable to said end cap section first end, wherein said memory/battery circuit is configured to store and supply digital data stored therewithin when said third USB connector or fourth USB connector is connected with any device having a suitable USB interface receptacle, wherein said memory/battery circuit is configured to store and supply power stored therewithin when said third USB connector or fourth USB connector is connected with any device having a suitable USB interface receptacle, and wherein said second USB connector is capable of removable connection within said third USB socket receiver cavity.

2. The recordation implement of claim 1, wherein said first stylus tip comprises rubber.

3. The recordation implement of claim 1, wherein said second stylus tip comprises rubber.

4. The recordation implement of claim 1, wherein said second flash drive section further comprises a pocket clip secured lengthwise and subjacent said second flash drive section second end.

5. The recordation implement of claim 1, wherein said end cap section comprises:

an end cap section housing;

a pair of fastening ring apertures secured subjacent said end cap section second end;

a fastening ring having a fastening ring first end and a fastening ring second end secured within a respective one of said pair of fastening rings; and, a fourth USB socket receiver cavity;

wherein said fourth USB connector is capable of friction fitting within said third USB socket receiver cavity.

6. The recordation implement of claim 1, wherein said pen cap section, said pen section, said flash drive section, said flash drive receiver, said second flash drive section and said end cap section are configured to form a coextensive structure when combined.

* * * * *